United States Patent [19]

Johnson

[11] 3,969,317

[45] July 13, 1976

[54] PARTICULATE METALLIC NICKEL ULTRAVIOLET STABILIZER FOR POLYPROPYLENE

[75] Inventor: Gordon B. Johnson, The Sea Ranch, Calif.

[73] Assignee: Chevron Research Company, San Francisco, Calif.

[22] Filed: Jan. 17, 1975

[21] Appl. No.: 541,807

[52] U.S. Cl. ........................................ 260/45.75 N
[51] Int. Cl.² .......................................... C08J 3/20
[58] Field of Search ............... 260/45.75 N, 94.9 B, 260/94.96 D, 93.7, 94.96 C, DIG. 43

[56] References Cited

UNITED STATES PATENTS

| | | | |
|---|---|---|---|
| 3,418,066 | 12/1968 | Caldwell et al. | 260/94.9 |
| 3,458,306 | 7/1969 | Lindquist | 75/5 |

FOREIGN PATENTS OR APPLICATIONS

| | | |
|---|---|---|
| 6,905,057 | 10/1970 | Netherlands |
| 47-27244 | 10/1972 | Japan |

OTHER PUBLICATIONS

Chemical Abstracts – citation 118886v, vol. 75, 1971, p. 20.
Advances in Polymer Science, – vol. 12, 1973, pp. 65 and 66.
Applied Polymer Symposia, – No. 4, (1967), pp. 29 to 39.
Advances in Polymer Science, – vol. 12, 1973, pp. 131 to 190.
Plastics & Polymers, – June 1968, pp. 195 to 203.
Chem. Abstracts, – vol. 78, citation 73161y.

Primary Examiner—V.P. Hoke
Attorney, Agent, or Firm—George F. Magdeburger; Dix A. Newell; S. Russell LaPaglia

[57] ABSTRACT

Effective inhibition of the ultraviolet degradation of a poly-1-olefin is accomplished by the incorporation of a certain finely divided metallic nickel into the polymer.

7 Claims, No Drawings

PARTICULATE METALLIC NICKEL ULTRAVIOLET STABILIZER FOR POLYPROPYLENE

BACKGROUND OF THE INVENTION

This application is concerned with ultraviolet-stabilized poly-1-olefin compositions and novel stabilizer compositions therefor.

Substantially crystalline poly-1-olefin such as polypropylene is in great demand for outdoor use as in the case of pile for outdoor carpets and grasslike playing field surfaces. However, it has a tendency to degrade when exposed to ultraviolet light which is present in sunlight. This photodegradation is evidenced by increased brittleness of the poly-1-olefin which results in flexural failure, poor wearing quality and a short life for the outdoor carpet or grasslike playing field surface. Consequently, the art teaches many combinations of materials which produce resistance to ultraviolet degradation. In general, many excellent inhibitors have comprised a combination of a benzophenone compound with an organonickel compound.

SUMMARY OF THE INVENTION

It has been found that effective inhibition of the ultraviolet degradation of poly-1-olefin can be accomplished with a finely divided metallic nickel, preferably produced by the Microgel process. The total nickel content in the polymer will range from about 0.05 to 5.0 percent, preferably 0.1 to 3.0 percent by weight based on poly-1-olefin, more preferably from 0.1 to 0.5 percent by weight and most preferably from 0.1 to about 0.2 percent by weight. The nickel particles have an average particle diameter in the range of from about 0.05 to 5.0 microns, preferably in the range of 0.5 to 2.0 microns.

PREFERRED EMBODIMENTS OF THE INVENTION

The nickel particles may be prepared by any suitable method, i.e., one that produces particles in the desired size range. A number of means are used to produce fine metal particles (Powder Metallurgy, R. L. Sand and C. R. Shakespeare, Neunes, London, 1966), including comminuting metals in a ball mill, sometimes with solvent, and atomization of molten metal, as well as the chemical means of precipitation. However, the preferred stabilizer is made by the Microgel process which produces fine metallic powders and mixtures of fine metallic powders with metal oxide particles. The Microgel nickel particulate is preferred as a UV stabilizer for its uniformity, homogeneity, small particle size and effectiveness. This process, which has been employed to produce dispersion-hardened metals, is described in U.S. Pat. No. 3,458,306, issued to Robert H. Lindquist, whose disclosure is hereby incorporated by reference.

Broadly the Microgel process comprises forming an alcoholic solution of a metal chloride, adding an epoxy compound to form a gel, drying the gel at nominal temperatures (e.g., 60°–250°F), oxidizing by calcining the gel in an oxygen containing atmosphere, such as air or oxygen, at elevated temperatures (e.g., about 800°–1000°F) and finally reducing the calcined material by heating with hydrogen at elevated temperatures in the range 600°–1800°F. In order to prepare the finely divided metallic nickel particles needed for polymer stabilization, the metal chloride is nickel chloride and the preferred metal chloride is nickel dichloride hexahydrate. The preferred alcoholic solvent is methanol. One satisfactory procedure utilizing these materials is Example 3 of U.S. Pat. No. 3,458,306.

The Microgel process can also be used to make mixtures of small metallic particles and metal oxides. Such mixtures may also be used for stabilizing polypropylene provided that the metallic constituent is nickel and that the metal oxide constituent is present in small amounts, less than 25% and preferably less than 10%. Such mixtures are readily prepared by the Microgel process as embodied in the following steps:

A. Forming a solution comprising
 a. nickel chloride in an amount such that nickel cation is at least 70 weight percent of the total metal cations in said solution,
 b. at least one metal chloride selected from the chlorides of metals, the oxides of which are not reducible in hydrogen at a temperature in the range 600° to 1800°F, the metal cation of said metal chloride being present in said solution in an amount of less than 30 weight percent of the total metal cations in said solution, and
 c. a lower alkanol;
B. adding to said solution an epoxy compound selected from the group consisting of lower alkylene oxides and epichlorohydrins, whereby a gel comprising metal hydroxides is formed;
C. converting said metal hydroxides to oxides; and
D. subjecting the resulting metal oxide-containing material to a reducing treatment at a temperature in the range of 600° to 1800°F.

The metals, the oxides of which are not reducible in hydrogen at a temperature in the range 600° to 1800°F, include Y, Ca, La, Be, Th, Mg, U, Hf, Ce, Al, Zr, Ba, Ti, Si, Ta, V, Nb, and Cr.

An embodiment of said Microgel process used to produce finely divided particles useful in this invention comprises employing nickel chloride as the solute in the solution of step (Aa) and thorium tetrachloride as the chloride of step (Ab).

The powdery product of the process may be used directly as the ultraviolet stabilizer or it may be shaken through a fine mesh screen.

The relationship between nickel particle size and temperature and time of hydrogenation has been disclosed in U.S. Pat. No. 3,458,306 and illustrated in an article of R. H. Lindquist in Modern Developments in Powder Metallurgy, Vol. 5, page 289, Plenum Press, 1971.

The normally solid, substantially crystalline poly-1-olefins are well known commercial commodities. Such polymers include Ziegler polyethylene, high-density polyethylene, stereoregular poly(butene-1), poly(4-methylpentene-1), etc. For present purposes the stereoregular, normally solid, substantially crystalline polypropylene is preferred. Such polypropylene is normally at least about 50% crystalline in character and is essentially insoluble in refluxing heptanes. Polypropylene is effectively stabilized by fine nickel particles in accordance with the invention.

The total nickel content in the polymer will vary from about 0.05 to 5 percent, preferably 0.1 to 3.0 percent by weight based on poly-1-olefin, more preferably from 0.1 to 0.5 percent by weight and most preferably from 0.1 to about 0.2 percent by weight. Total nickel content, for present purposes, refers to the nickel particles incorporated in the polymer according to the present invention. The nickel particles have an average particle diameter in the range of from about 0.05 to 5.0 microns, preferably in the range 0.5 to 2.0 microns. The polymeric composition of the present invention may also contain certain additives which are conventionally used to impart desirable properties such as additional photostabilizers, antioxidants, heat stabilizers, dye acceptors, pigments, dyes, fillers and the like. The polyolefin is stabilized by the finely divided metallic nickel by simply blending same into the polyolefin powder or granulate prior to melting.

As previously mentioned, the long-life ultraviolet-light-stable poly-1-olefin composition of the invention has a preferred embodiment in the form of a pile fabric such as those normally found in indoor and outdoor carpets and upholstery which have some exposure to sunlight. These pile fabrics need to be resilient to have the desired softness. By the same token, any tendency of the pile material to become brittle and lose its flexural quality will result in undesirable wear and should be minimized. Suitable pile yarns may be of a variety including both extruded fibers and fibrillated films, with the latter being preferred for present purposes due to their effectiveness in the production of long-life outdoor carpet and playing field surfaces. Examples of fibrillated film materials and their process of manufacture in the form of "fibrous web" are described in considerable detail in Guenther U.S. Pat. No. 3,496,259 and Guenther, Johnson and Meader, Jr., U.S. Pat. No. 3,496,260, both issued Feb. 17, 1970. Such fibrillated films are split into narrow strips and twisted at about two turns per inch to give a pile yarn. This pile yarn, in turn, is then suitable for securing into a conventional backing of natural or synthetic material to make a carpet or surface covering.

The following examples illustrate the preparation of the particulate metallic nickel employed as the stabilizer, as well as the long-life ultraviolet-light-stable poly-1-olefin compositions and articles made thereof in accordance with the present invention. These examples are in no manner intended to limit the invention as described. Unless otherwise indicated, percentages are on a weight basis.

EXAMPLE 1

A 50-gallon Pfaudler kettle was charged with 9 gallons of methanol, 11.25 kg of nickel dichloride hexahydrate and 82 grams of thorium tetrachloride. The resulting solution was heated to 135°F, and then 9.5 liters of propylene oxide was added over a period of 1 hour. The reaction mixture was stirred and heated at 150°F for 2 hours. After cooling to 130°F, it was filtered and the filter cake was dried for 72 hours in a steam heated vaccum oven.

One hundred fifty grams of the above dried filter cake were charged to a laboratory sized fluid-bed reactor consisting of an upright quartz tube containing a fritted quartz disc at the base through which heated gas can be passed into the solid charge. The charge was fluidized with air. The temperature was raised to 800°F and the mixture was calcined in air at this temperature for 1 hour. Next fluidization was effected by hot nitrogen until all the air was swept out and then reduction of the nickel component was accomplished by fluidizing with hydrogen for 3 hours at 800°F.

The product resulting from this treatment was a powder consisting essentially of 98 weight percent nickel metal and 2 weight percent thorium oxide. Analysis by electron microscope showed the nickel metal to have an average particle size of 0.8 microns.

EXAMPLE 2

Essentially the same procedure as Example 1 was followed using 17 gallons of methanol, 53.3 pounds of nickel dichloride hexahydrate, 200 grams of thorium tetrachloride, and 6 gallons of propylene oxide. Gelation was effected at 90°F. The product was dried for 48 hours at 120°F. The resulting mass was ground in a ball mill and sieved through a 50 mesh screen.

Calcining was carried out in air at 800°F for 4 hours. A portion of the resulting product, 1790 grams, was washed with 2 gallons of hot methanol, filtered and dried. This dry cake was repulverized and the portion passing through a 65 mesh screen but not a 325 mesh screen, 1100 grams, was reduced with hydrogen in the quartz fluid bed apparatus. Reduction was carried out at 1050°F for 5 hours. The product was a powder, 98 weight percent nickel and 2 weight percent thorium oxide. Analysis of the product showed the metallic nickel particles to have an average diameter of 1.2 microns.

EXAMPLE 3

Commercial polypropylene powder having a melt flow rate of 4–5 was blended with 0.65 weight percent of a conventional antioxidant mixture and with the indicated amounts (see table) of stabilizer in a Brabender mixer until homogeneous. The composition was hot-pressed to a film of 1 to 1½ mils thickness. In the accelerated ultraviolet stability tests film samples were continuously exposed to ultraviolet radiation from a mercury lamp. Test results are given as time to film failure relative to unstabilized film. Failure of the film is indicated by embrittlement and rupture on flexing.

TABLE

| | Accelerated Ultraviolet Stability Test | | | | |
|---|---|---|---|---|---|
| Stabilizer, % by weight | 1 | 2 | 3 | 4 | 5 |
| Metallic Ni particles[1] | 0 | 0.18 | 0 | 0.1 | 0.4 |
| Metallic Ni particles[2] | 0 | 0 | 0.1 | 0 | 0 |
| Stabilizer A[3] | 0 | 0 | 0.5 | 0.5 | 0.5 |
| Stabilizer B[4] | 0 | 0 | 0.5 | 0.5 | 0.5 |
| Relative time to failure | 1.0 | 1.8 | 1.6 | 2.0 | 1.0 |

[1] Product of Example 1
[2] Product of Example 2
[3] 2-hydroxy-4-n-octyloxy benzophenone
[4] 2,4-di-t-butylphenyl-3,5-di-t-butyl-4-hydroxybenzoate The results of the accelerated ultraviolet stability test show the effectiveness of particulate metallic nickel in extending the life of polypropylene subjected to intense UV radiation. The composition of col. 2 containing only 0.18 weight percent of nickel, based on polypropylene, increased the time to failure to 1.8 that of the unstabilized polypropylene of composition 1 in the Table. The results obtained with compositions 3–5 indicate that particulate metallic nickel is not appreciably improved as a UV stabilizer by the inclusion of substantial amounts of the known stabilizers A and B of the table (footnotes 3 and 4). Furthermore, the inclusion of larger amounts of metallic nickel particulate with these stabilizers, as in composition 5, seems to lead to an interaction which yields no net stabilization.

While the character of this invention has been described in detail with several examples, this has been done by way of illustration only and without limitation of the invention. It will be apparent to those skilled in the art that modifications and variations of the illustrative examples may be made in the practice of the invention within the scope of the following claims.

What is claimed is:

1. A poly-1-olefin composition comprising a major amount of substantially crystalline poly-1-olefin and from 0.05 to 5 percent by weight based on the poly-1-olefin of metallic nickel particles having an average particle size of from about 0.05 to about 5 microns.

2. The composition of claim 1 in which said poly-1-olefin is polypropylene.

3. A shaped article having a resistance to the deteriorative effects of exposure to sunlight composed primarily of the composition of claim 1.

4. A pile fabric suitable for use outdoors comprising a backing material and pile yarns secured in said backing materials, the pile yarns being composed primarily of the poly-1-olefin composition of claim 1.

5. A poly-1-olefin composition comprising a major amount of substantially crystalline poly-1-olefin and from about 0.05 to 5 percent by weight, based on the poly-1-olefin, of metallic nickel particles, wherein said metallic nickel particles are produced by forming an alcoholic solution of nickel chloride, adding an epoxy compound thereto to form a gel, calcining the gel in air or oxygen at elevated temperatures and reducing the calcined material by heating with hydrogen at a temperature of about 600°–1800°F.

6. A poly-1-olefin composition according to claim 5 wherein said alcoholic solution comprises methanol as the solvent, said epoxy compound is propylene oxide and said nickel chloride is nickel dichloride hexahydrate.

7. A poly-1-olefin composition comprising a major amount of substantially crystalline poly-1-olefin and from 0.05 to 5 percent by weight based on the poly-1-olefin of metallic nickel particles, wherein said metallic nickel particles are produced by the process comprising the steps of:

A. forming a solution comprising
 a. nickel chloride in an amount such that nickel cation is at least 70 weight percent of the total metal cations in said solution,
 b. at least one metal chloride selected from the chlorides of metals, the oxides of which are not reducible in hydrogen at a temperature in the range 600° to 1800°F, the metal cation of said metal chloride being present in said solution in an amount of less than 30 weight percent of the total metal cations in said solution, and
 c. a lower alkanol;

B. adding to said solution an epoxy compound selected from the group consisting of lower alkylene oxides and epichlorohydrins, whereby a gel comprising metal hydroxides is formed;

C. converting said metal hydroxides to oxides; and

D. subjecting the resulting metal oxide-containing material to a reducing treatment at a temperature in the range of 600° to 1800°F.

* * * * *